United States Patent [19]

Nagamine

[11] Patent Number: 4,615,395

[45] Date of Patent: Oct. 7, 1986

[54] REVERSIBLE ROTARY CULTIVATING APPARATUS

[75] Inventor: Yoshifumi Nagamine, Habikino, Japan

[73] Assignee: Kubota, Ltd., Osaka, Japan

[21] Appl. No.: 639,014

[22] Filed: Aug. 9, 1984

[30] Foreign Application Priority Data

Aug. 11, 1983 [JP] Japan .................... 58-147342

[51] Int. Cl.⁴ .................... A01B 33/02; A01B 33/10
[52] U.S. Cl. .................... 172/91; 172/548; 172/123; 56/294
[58] Field of Search .................... 172/91, 96, 94, 45, 172/123, 550, 540, 548, 544, 28, 533, 549, 554; 56/294

[56] References Cited

U.S. PATENT DOCUMENTS

| | | | |
|---|---|---|---|
| 2,990,667 | 7/1961 | Schwalm | 56/294 |
| 3,093,951 | 6/1963 | Barrows | 172/45 |
| 3,422,611 | 1/1969 | Barrows | 56/294 |
| 3,557,880 | 1/1971 | Lely | 172/91 |
| 3,952,811 | 4/1976 | Carre | 172/45 |
| 4,492,271 | 1/1985 | Doering | 172/123 |

FOREIGN PATENT DOCUMENTS

| | | | |
|---|---|---|---|
| 2551857 | 6/1977 | Fed. Rep. of Germany | 172/123 |
| 2241232 | 3/1975 | France | 56/594 |
| 2247146 | 5/1975 | France | 172/540 |

*Primary Examiner*—Richard J. Johnson
*Attorney, Agent, or Firm*—Birch, Stewart, Kolasch & Birch

[57] ABSTRACT

Cultivating tines, each having opposite cutting edge portions, are pivotably supported by mount brackets on a tine shaft reversibly rotatable about a horizontal lateral axis. One of the edge portions of each tine is positionable in a position rearward with respect to the direction of forward rotation, while the other edge portion is positionable in a position rearward with respect to the direction of reverse rotation. The edge portions differ in upstanding posture when positioned for rotation in the intended direction. The curved edge line of the reverse-rotation edge portion is more upstanding than that of the forward-rotation edge portion when coming into contact with the ground.

6 Claims, 10 Drawing Figures

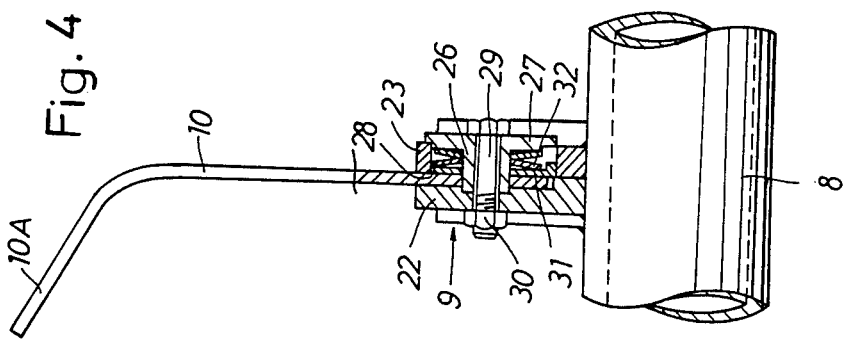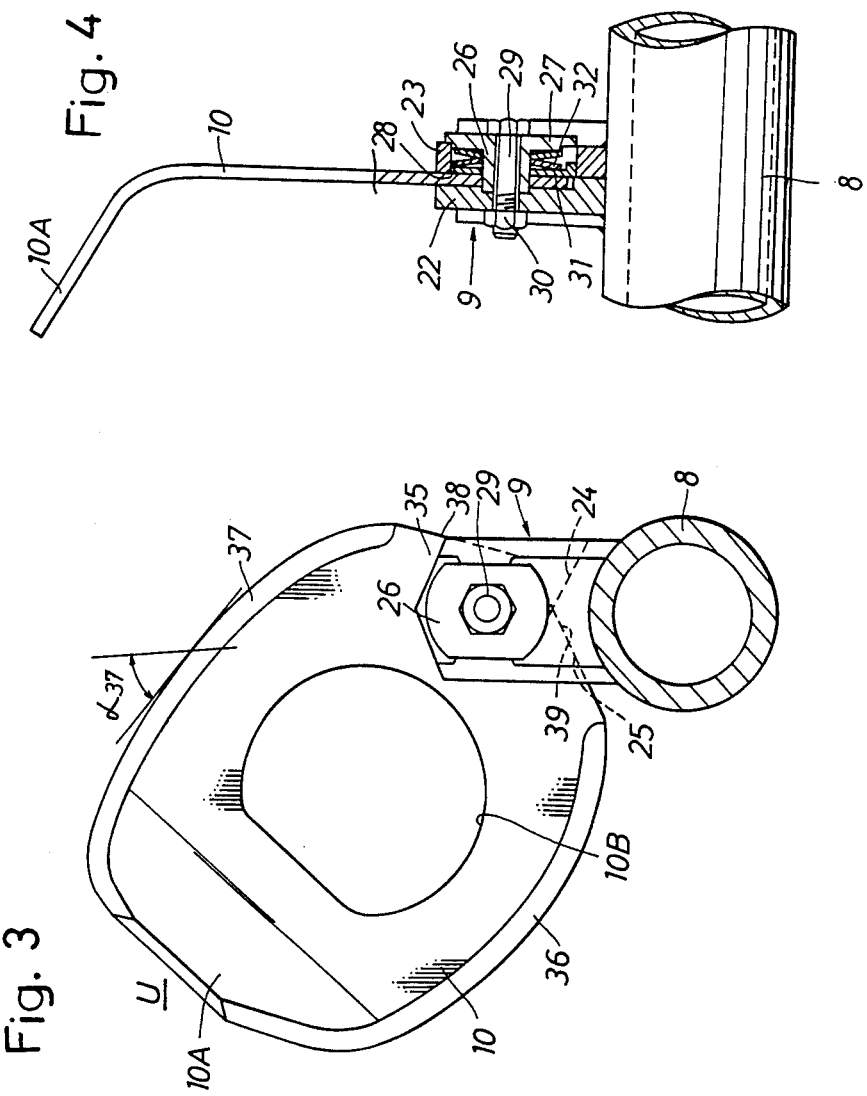

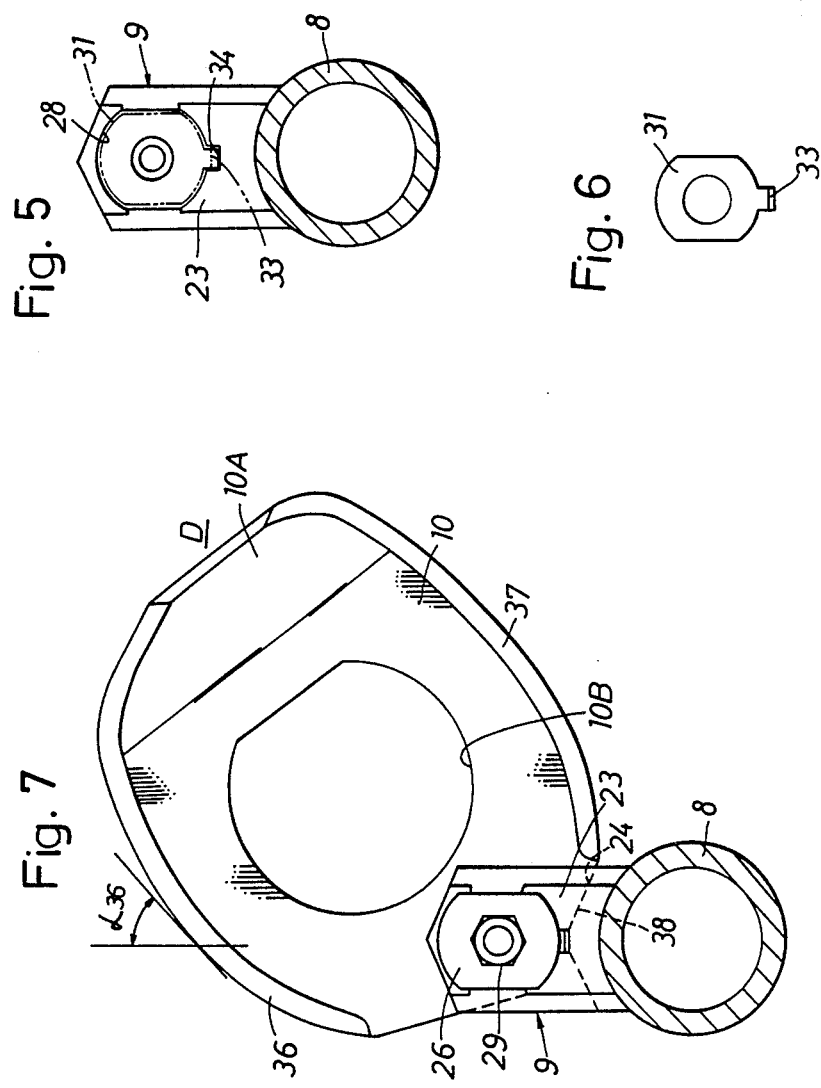

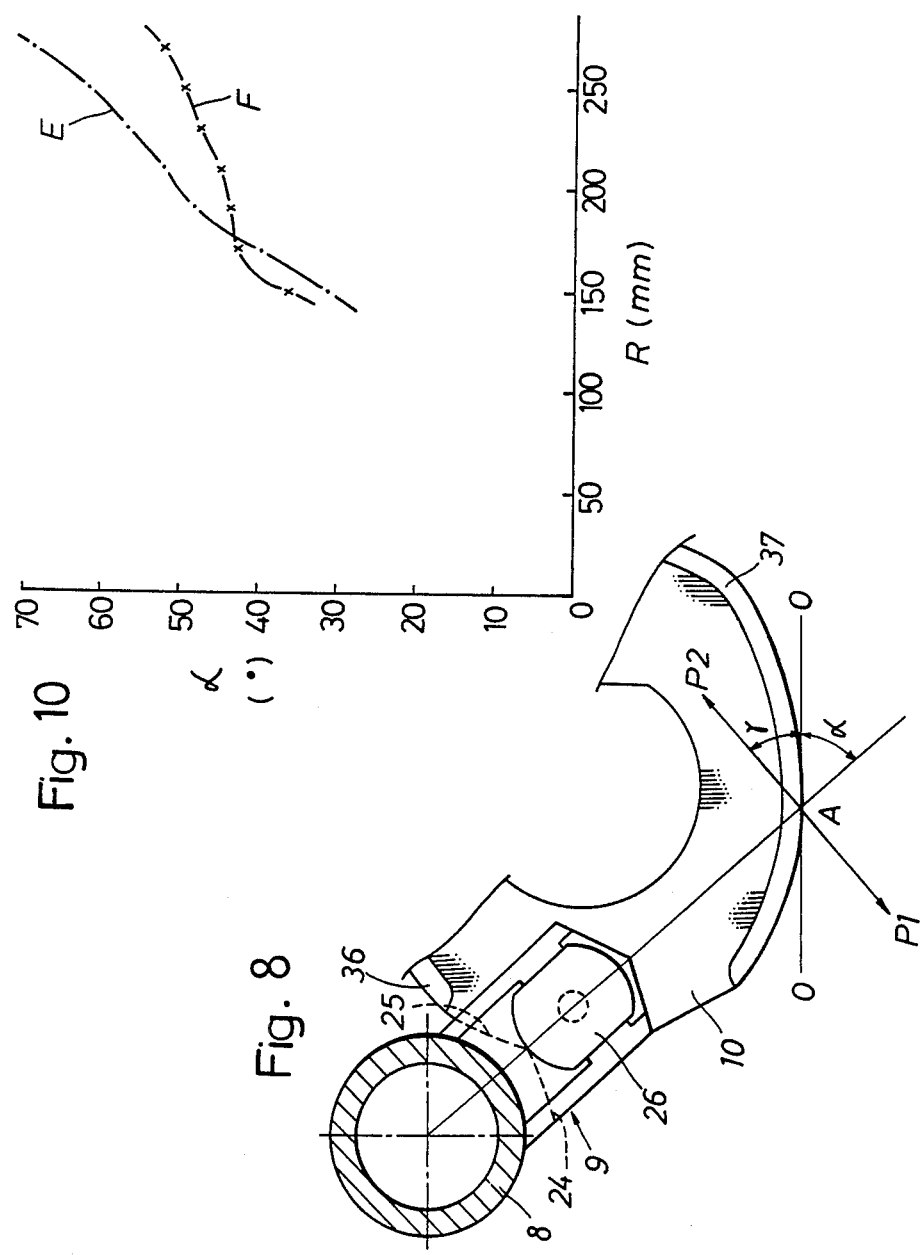

REVERSIBLE ROTARY CULTIVATING APPARATUS

BACKGROUND OF THE INVENTION

Published Examined Japanese Utility Model Application SHO 41-1925 discloses a reversible rotary cultivating apparatus wherein tines adapted for cultivation by reversible rotation and each including a forward edge portion and a reverse edge portion at opposite sides of the blade portion thereof are attached to a reversibly rotatable tine shaft. In accordance with the kind of crop to be grown or field condition, the tine shaft is rotated about a lateral axis forward or reversely to selectively perform forward-rotation cultivation (downcutting) or reverse-rotation cultivation (upcutting).

With this conventional apparatus, the forward and reverse edge portions of each tine have curved edge lines which are identically shaped symmetrically for forward rotation and reverse rotation and are identical in cutting angle at any optional point along the edge line, so that reverse-rotation cultivation requires much greater power consumption than forward-rotation cultivation.

When the apparatus cultivates by forward rotation, the tines break up lumps of soil and throw the soil rearward opposite to the direction of advance of the apparatus without carrying the soil forward toward the advancing direction, whereas during reverse-rotation cultivation, the broken soil is raised at the front side of the tine shaft and thereafter thrown rearward with the revolution of the tines. Thus, the tines interfere with the soil for a longer period of time in the latter case. Since the forward and reverse edge portions of the convention tine are curved identically, the power consumption is greater in the latter case than in the former case by an amount corresponding to the increase in the period of interference.

For example, when an apparatus of the type described was operated with the tine shaft driven at about 169 to 171 r.p.m. for reverse rotation or at about 179 r.p.m. for forward rotation to measure the average power PS required of the PTO shaft of the tractor relative to the pitch of cultivation, P, the power consumption was much greater for reverse-rotation cultivation C than for forward-rotation cultivation B as shown in FIG. 1.

SUMMARY OF THE INVENTION

An object of the present invention is to provide a reversible rotary cultivating apparatus in which a plurality of tines are pivoted to a tine shaft and are shiftable to a forward inclined position. The outer end of each tine is positioned rearward from its base portion with respect to the direction of forward rotation or to a reverse inclined position. The outer end of the tine is positioned rearward from its base portion with respect to the direction of reverse rotation, each of the tines having a forward-rotation edge portion (forward edge portion) and a reverse-rotation edge portion (reverse edge portion). The reverse edge portion has a curved edge line which is more upstanding when cultivating than the corresponding edge line of the forward edge portion so as to reduce the power to be consumed for reverse-rotation cultivation and to reduce the width of the tine.

Another object of the invention is to provide a reversible rotary cultivating apparatus of the type described which is adapted to rotate at a high speed for cutting soil while running when attached to a tractor and. In addition each tine breaks up the soil vertically with its curved edge portion while turning up the soil sidewise with a rake portion. Furthermore the curved edge line of the reverse edge portion is more upstanding then the curved edge line of the forward edge portion when breaking up the soil to reduce the power to be consumed.

Still another object of the invention is to provide a reversible rotary cultivating apparatus of the type described wherein the forward edge portion and the reverse edge portion are made different in cutting angle, and the tine is centrally formed with a hole resembling a space defined by a pair of hatchet-shaped tines which are joined together back-to-back. The tine is thus made reversible without entailing a great increase in cutting resistance.

To fulfill these objects, the present invention provides a reversible rotary cultivating apparatus wherein tines for cultivating by reversible rotation are attached, each at its base portion, to a tine shaft reversibly rotatable about a lateral axis. Each of the tines include a blade portion and a forward edge portion and a reverse edge portion formed at opposite sides of the blade portion. The apparatus is characterized in that each tine is pivoted to a mount bracket on the tine shaft and is shiftable to a forward inclined position wherein the outer end of the tine is positioned rearward from its base portion with respect to the direction of forward rotation or to a reverse inclined position wherein the outer end of the tine is positioned rearward from its base portion with respect to the direction of reverse rotation. The mount bracket has a stopper engageable with the base portion of the tine for positioning the tine in the forward position or in the reverse position. The forward and reverse edge portions each has a curved edge line. The curved edge line of the reverse edge portion in the reverse inclined position being more upstanding than the curved edge line of the forward edge portion in the forward inclined position when coming into contact with the ground.

BRIEF DESCRIPTION OF THE DRAWINGS

FIG. 3 is a fragmentary side elevation showing the same during reverse-rotation cultivation;

FIG. 4 is a sectional view showing the same portion;

FIG. 5 is a side elevation showing a mount bracket;

FIG. 6 is a side elevation showing a retaining plate;

FIG. 7 is a fragmentary side elevation showing the embodiment during forward-rotation cultivation;

FIG. 8 is a diagram for illustration;

FIG. 9 is a load characteristics diagram; and

FIG. 10 is a diagram showing the relationship between the radius and the angle α to be stated.

DETAILED DESCRIPTION OF THE INVENTION

Figure 1:
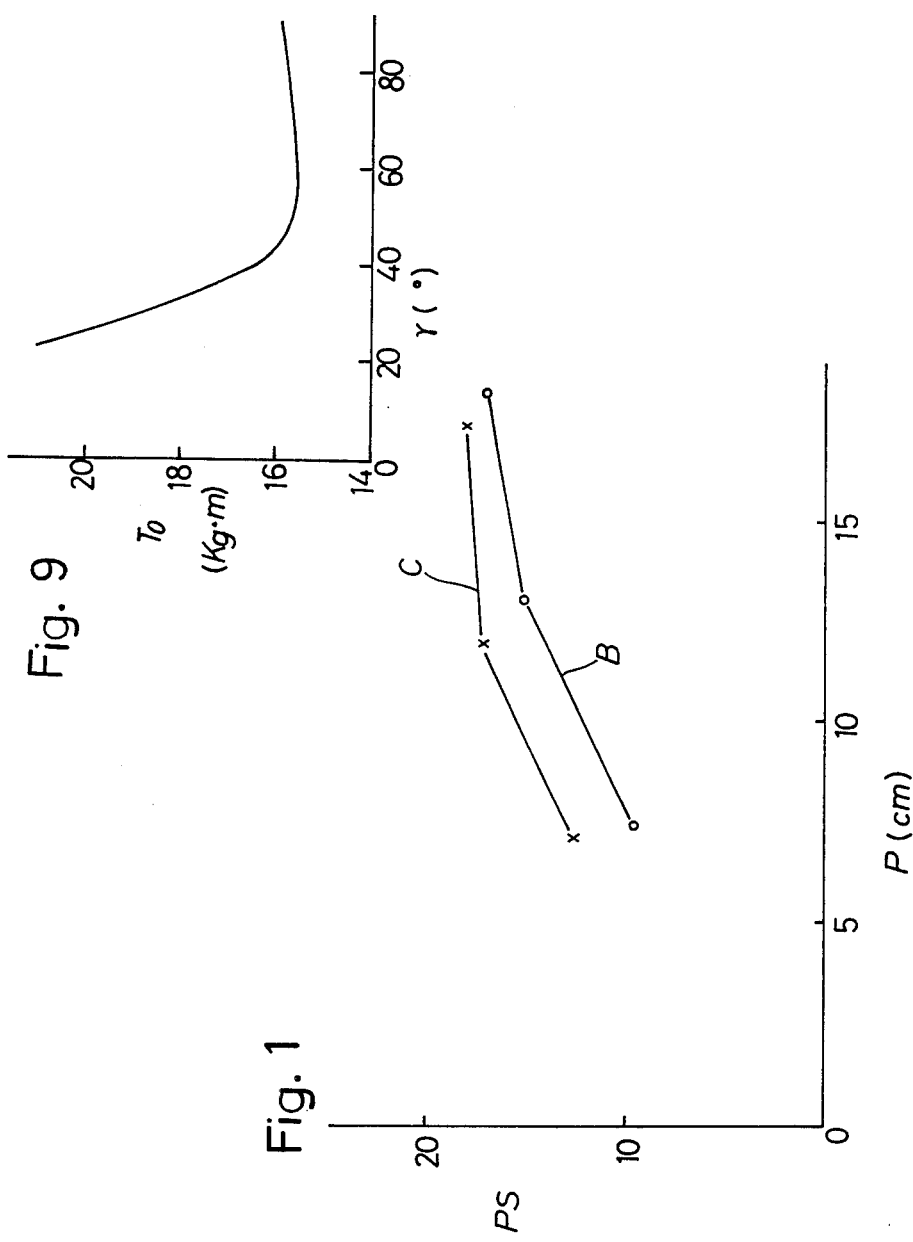
FIG. 1 is a diagram showing power consumption characteristics.
Figure 2:
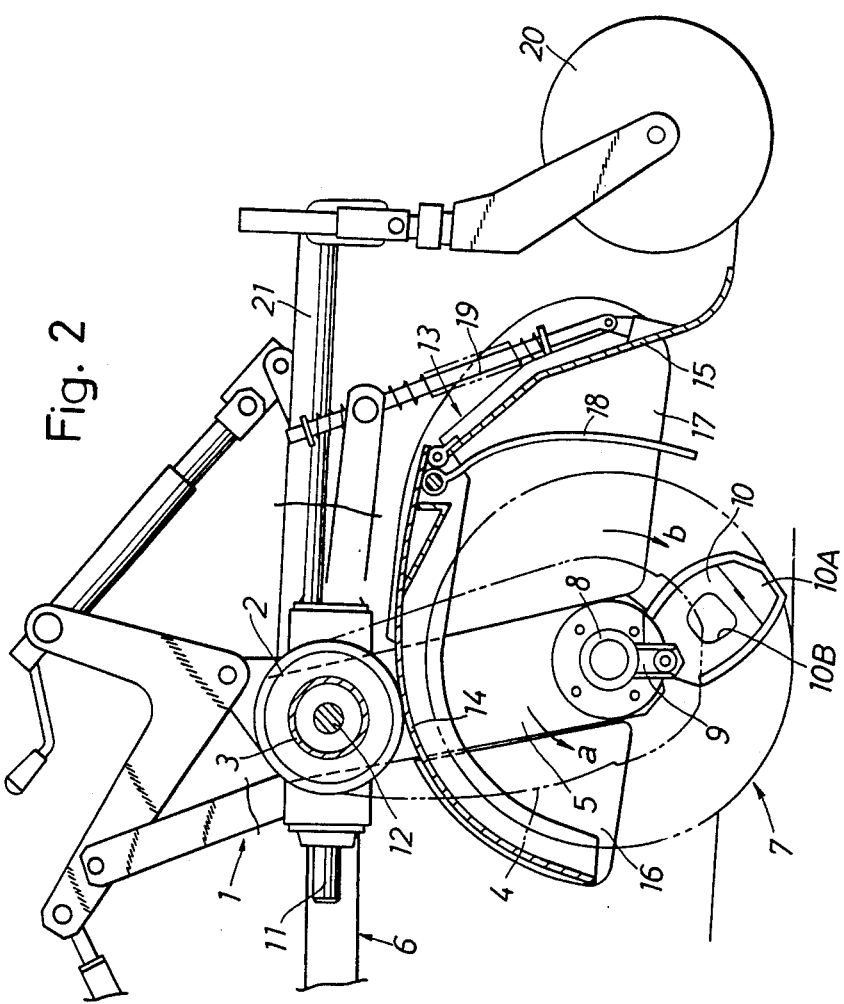
FIG. 2 is a side elevation in section showing an embodiment of the present invention.

FIG. 2 shows a reversible rotary cultivating apparatus liftably attached to a tractor. The apparatus has a frame assembly 1 comprising an input gear case 2, a pair of opposite support arms 3 extending laterally outward from the case 2, a chain case 4 attached to the outer end of one of the support arms 3, and a side frame 5 attached to the outer end of the other support arm 3. The frame assembly 1 is liftably connected to the rear end of the tractor (not shown) by a three-point link assembly 6.

A rotary tiller unit 7 attached to the frame assembly 1 is covered with a cover assembly 13. The tiller unit 7 comprises a tine shaft 8 rotatably supported by the lower ends of the chain case 4 and the side frame 5, and a multiplicity of tines 10 attached to mount brackets 9 fixed to the tine shaft 8. The tine shaft 8 is driven selectively in a forward or reverse direction by the PTO shaft of the tractor through an input shaft 11 and forward-reverse change mechanism in the gear case 2, a transmission shaft 12 within the support arm 3 and a chain transmission mechanism within the chain case 4.

The rotary cover assembly 13 comprises a main cover 14, a rear cover 15, front side covers 16 and rear side covers 17. At the rear end of the main cover 14 in front of the rear cover 15, a comb-shaped rake 18 is provided which is curved in an arcuate form along the path of rotation of the tiller unit 7. The rear cover 15 is biased downward by spring means 19.

The frame assembly 1 has a vertically adjustable support rod 21 carrying a pair of opposite gauge wheels 20, whereby the depth of cultivation by the rotary tiller unit is adjustable.

The mount bracket 9 comprises a pair of opposed bracket members 22, 23 as seen in FIGS. 3 and 4. Stopper portions 24, 25 are provided between the bracket members 22, 23. The base portion 35 of the tine 10 is inserted between the bracket members 22, 23. The bracket member 23 is formed with an oblong bore 28 having fitted therein a flange 27 on a collar 26. The collar 26 extends through the tine 10 and fits in the other bracket member 22. The collar 26 is fastened to the bracket 22 by a bolt 29 inserted through the flange 27 and collar 26 and by a nut 30 screwed on the bolt. A retaining plate 31 and dish springs 32 are provided between the flange 27 of the flanged collar 26 and the tine 10. The dish springs 32 resiliently retain the tine 10 with such a torque that will prevent the tine 10 from being pivotally moved by a centrifugal force during rotation as will be described later. The retaining plate 31 has an oblong form conforming to the shape of the fitting bore 28 and is formed with an engaging pawl 33 as seen in FIGS. 5 and 6. The pawl 33 is engaged in an engaging groove 34 formed in the bracket member 23 and open to the fitting bore 28. Accordingly even when the bracket member 23 falls down, the retaining plate 31 will not move with pivotal movement of the tine 10. The tine 10 has the base portion 35 held between the pair of bracket members 22, 23, a forward edge portion 36 and a reverse edge portion 37 formed on opposite sides of its main body (blade portion) and each curved to bulge toward the working direction of rotation concerned, a rake portion 10A formed at its outer end by being bent, and a center hole 10B defined by these portions. The curved edge line of the reverse edge portion 37 is more upstanding than that of the forward edge portion 36 when coming into contact with the ground. The curved edge lines of these edge portions are asymmetric.

The base portion 35 of the tine has abutting parts 38, 39 which are positionable in opposed relation to the stopper portions 24, 25, respectively. The tine 10 is positionable in a forward position D, with the abutting part 38 in bearing contact with the stopper portion 24 as seen in FIG. 7, for forward-rotation cultivation. Alternatively, the tine 10 is positionable in a reverse position U, with the abutting part 39 in contact with the stopper portion 25 as seen in FIG. 3, for reverse-rotation cultivation. When in the position D or U, the tine 10 is so inclined that the rake portion 10A at its outer end is positioned rearward from its base portion 35 with respect to the direction of rotation concerned. The tine 10 is resiliently retained by the dish springs 32 so as to be shiftable between these two positions D, U about the collar 26.

The reversible rotary cultivating apparatus operates in the following manner. The tine shaft 8 is reversible by the forward-reverse change mechanism. The apparatus selectively performs forward-rotation cultivation (in the direction of arrow a shown) or reverse-rotation cultivation (in the direction of arrow b) by the forward or reverse rotation of the tine shaft 8. FIG. 2 shows the apparatus during reverse-rotation cultivation with the tines 10 in the reverse position U. Since the tine shaft 8 rotates in the direction of arrow b at this time, the reverse edge portions 37 of the tines 10 bite into the soil to break up the soil, and the broken-up soil is carried in the direction of arrow b along with weeds and the like with the revolution of the tines 10 and is further sent rearward along the main cover 14. Large lumps of soil included in the broken-up soil and weeds are separated off by the rake 18 and fall at the front side of the rake 18, while pulverized soil passes through the rake 18 and then falls, with the result that the cultivated soil can be divided into a surface layer of pulverized soil and an underlying layer of large lumps of soil. The weeds and the like can also be placed under the surface layer along with large lumps of soil.

During forward-rotation cultivation, the tine shaft 8 rotates in the direction of arrow a, causing the forward edge portions 36 of the tines 10 to act for cultivation. Stated more specifically with reference to FIGS. 3 and 7, a circle having a radius R from the center 01 of the tine shaft 8 intersects the curved edge line of each edge portion 36 (37) at a point A. A radial line A1—A1 through the point A makes an angle $\alpha_{36}$ with a line O—O tangent to the curved edge line of the forward edge portion 36 at the point A, and an angle $\alpha_{37}$ with a line O—O tangent to the curved edge line of the reverse edge portion 37 at the point A. The angle $\alpha_{37}$ is smaller than the angle $\alpha_{36}$ to make the edge lines asymmetric.

FIG. 8 shows the edge portion 37 having the above curved edge line when it comes into contact with the ground at point A. The force then exerted on the ground by the edge portion 37 is indicated at P1, and the reaction, i.e. cutting resistance, at P2. The drawing further shows a line O—O tangent to the edge curve at point A, a cutting angle $\gamma$ and an angle $\alpha$. It is seen from FIG. 8 that the angles $\gamma$ and $\alpha$ are in such relationship that as the cutting angle $\gamma$ increases, the angle $\alpha$ decreases, whereas as the cutting angle $\gamma$ decreases, the angle $\alpha$ increases.

FIG. 9 shows the load characteristics of the tine 10 at varying cutting angles $\gamma$. Within a certain range of angles $\gamma$, the total cultivating torque To decreases with an increase in the angle $\gamma$. This indicates that the cultivating torque can be reduced by decreasing the angle $\alpha$.

With the tine 10 of the present invention, therefore, the curved edge lines of the portions 36 and 37 are made asymmetric, and the curved edge line of the reverse edge portion 37 is made more upstanding than that of the forward edge portion 36 when coming into biting contact with the ground. Thus, the angle $\alpha_{37}$ of the reverse edge portion 37 is smaller than the angle $\alpha_{36}$ of the forward edge portion 36. Consequently it is possible to reduce the power consumption for reverse-rotation cultivation by a corresponding amount to a value generally equivalent to the power consumption for forward-rotation cultivation.

In this case, the edge portions 36 and 37 of the tine 10 extend over a distance corresponding to a radius of about 150 to about 280 mm from the center of the tine shaft 8. When the curved edge lines have the relationship between the radius R and the angle α shown in FIG. 10, the depth of cultivation must be set at a radius of at least 180 mm. The curves E and F represent the forward edge portion 36 and the reverse edge portion 37, respectively, in FIG. 10.

Because the tine 10 is pivotally shiftable to the forward position D or to the reverse position U, the tine 10 can be of reduced width in the direction of rotation although having the above-mentioned curved edge lines.

According to the present invention, the curved edge line of the reverse edge portion is made more upstanding than that of the forward edge portion when coming into biting contact with the ground, whereby reverse-rotation cultivation can be carried out with a smaller amount of power than is heretofore required. Moreover, the tine, which is pivotally shiftable to the forward position or to the reverse position, can be of reduced width in the direction of rotation although having the foregoing curved edge lines. Thus the apparatus of the invention is very useful.

What is claimed is:

1. A reversible rotary cultivating apparatus wherein tines for cultivation by reversible rotation are attached, each at its base portion, to a tine shaft reversibly rotatable about a lateral axis, each of the tines including a blade portion and a forward edge portion and a reverse edge portion formed at opposite sides of the blade portion, the apparatus being characterized in that each of the tines is pivoted to a mount bracket on the tine shaft and is shiftable to a forward inclined position wherein the outer end of the tine is positioned rearward from its base portion with respect to the direction of forward rotation or to a reverse inclined position wherein the outer end of the tine is positioned rearward from its base portion with respect to the direction of reverse rotation, the mount bracket having a stopper engageable with the base portion of the tine for positioning the tine in the forward position or in the reverse position, the forward and reverse edge portions each having a curved edge line, the curved edge lines being asymmetric and bulging toward the direction of rotation, a radial line through the center of the tine shaft making a smaller angle with a line tangent to the curved edge line of the reverse edge portion than with a line tangent to the curved edge line of the forward edge portion when the radial line intersects the tangent lines, at positions on the edge lines which are at the same distance from the center of the tine shaft.

2. The apparatus as defined in claim 1, wherein the tine is bent to provide a rake portion at the outer end.

3. A reversible rotary cultivating apparatus, comprising:

a tine shaft reversibly rotatable about a lateral axis;

a plurality of mount brackets disposed on said tine shaft;

a plurality of reversibly rotating tines pivotally attached to said mount brackets; said tines having a blade portion and a forward edge portion formed at opposite sides of the blade portion; said tines being pivotally mounted on the tine shaft and are shiftable to a forward inclined position and a reverse inclined position;

said forward inclined position having an outer end of said tines positioned rearward from the base portion of said tines with respect to the forward rotation;

said reverse inclined position having an outer end of said tines positioned rearward from the base portion of said tines with respect to the reverse rotation;

said respective mount brackets having a stopper engageable with the corresponding base portion of said tines at the forward and reverse positions;

said forward and reverse edge portions having curved edge lines asymmetric and bulging toward the direction of rotation;

said curved edge line of the reversed edge portion in the reverse inclined position has a larger cutting angle thereby being more upstanding than the curved edge line of the forward edge portion in the forward inclined position when coming into contact with the ground, thereby reducing power consumption during reversible rotary cultivation.

4. The apparatus as defined in claim 3, wherein the tine is bent to provide a rake portion at the outer end.

5. The apparatus as defined in claim 3, wherein the blade portion is centrally formed with a hole.

6. A reversible rotary cultivating apparatus wherein tines for cultivation by reversible rotation are attached, each at its base portion, to a tine shaft reversibly rotatable about a lateral axis, each of the tines including a blade portion and a forward edge portion and a reverse edge portion formed at opposite sides of the blade portion, the apparatus being characterized in that each of the tines is pivoted to a mount bracket on the tine shaft and is shiftable to a forward inclined position wherein the outer end of the tine is positioned rearward from its base portion with respect to the direction of forward rotation or to a reverse inclined position wherein the outer end of the tine is positioned rearward from its base portion with respect to the direction of rotation, the mount bracket having a stopper engageable with the base portion of the tine for positioning the tine in the forward position or in the reverse position, the forward and reverse edge portions each having a curved edge line, the curved edge lines being asymmetric and bulging toward the direction of rotation, the curved edge line of the reverse edge portion in the reverse inclined position has a larger cutting angle thereby being more upstanding than the curved edge line of the forward edge position in the forward inclined position when coming into contact with the ground, thereby reducing power consumption during reversible rotary cultivation, wherein the blade portion is centrally formed with a hole.

* * * * *